United States Patent
Maki (10) Patent No.: US 8,733,322 B2
(45) Date of Patent: May 27, 2014

(54) AIR-FUEL RATIO CONTROL DEVICE FOR A CARBURETOR

(75) Inventor: Kazuhiro Maki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 236 days.

(21) Appl. No.: 13/501,831

(22) PCT Filed: Aug. 25, 2010

(86) PCT No.: PCT/JP2010/064337
§ 371 (c)(1),
(2), (4) Date: Apr. 13, 2012

(87) PCT Pub. No.: WO2011/048871
PCT Pub. Date: Apr. 28, 2011

(65) Prior Publication Data
US 2012/0199099 A1   Aug. 9, 2012

(30) Foreign Application Priority Data

Oct. 22, 2009   (JP) ................. 2009-243549

(51) Int. Cl.
| | |
|---|---|
| *F02D 9/10* | (2006.01) |
| *F02D 41/00* | (2006.01) |
| *F02D 11/10* | (2006.01) |
| *F02D 9/08* | (2006.01) |
| *F02M 1/08* | (2006.01) |

(52) U.S. Cl.
CPC .......... *F02D 41/0002* (2013.01); *F02D 11/105* (2013.01); *F02D 11/106* (2013.01); *F02M 1/08* (2013.01)
USPC .......................................... 123/442; 123/336

(58) Field of Classification Search
CPC . F02D 11/105; F02D 11/106; F02D 41/0002; F02M 1/08; F02M 7/20
USPC ............ 123/336, 442, 331, 437, 438, 179.16, 123/179.18; 701/103
See application file for complete search history.

(56) References Cited

U.S. PATENT DOCUMENTS

| | | | |
|---|---|---|---|
| 4,524,742 A * | 6/1985 | Bonfiglioli et al. | ........... 123/438 |
| 4,753,209 A | 6/1988 | Hibino et al. | |

(Continued)

FOREIGN PATENT DOCUMENTS

| | | |
|---|---|---|
| CN | 1171487 | 1/1998 |
| CN | 1869422 | 11/2006 |

(Continued)

OTHER PUBLICATIONS

Notice of Allowance issued Nov. 28, 2013 in corresponding Korean Application No. 10-2012-7008141 (with English translation).

(Continued)

*Primary Examiner* — Mahmoud Gimie
(74) *Attorney, Agent, or Firm* — Wenderoth, Lind & Ponack, L.L.P.

(57) ABSTRACT

It is intended to provide an air-fuel ratio control device for a carburetor, which is capable of variably inject fuel by opening and closing a choke valve in accordance with an opening degree of a throttle valve and the load and which is capable of achieving low cost, clean emission and fuel saving by attaining a desired air-fuel ratio in an entire operational range (rotation speed, load) of the internal combustion engine. The air-fuel ratio control device is provided with, but not limited to, a choke valve 6 arranged in an intake path of an internal combustion engine 1, a throttle valve 7 arranged in the intake path on a downstream side of the choke valve, a first stepper motor 8 driving the choke valve 6 to adjust an opening degree of the choke valve 6, a second stepper motor 9 driving the throttle valve 7 to adjust an opening degree of the throttle valve 7, and a controller 12 controlling the opening degree of the choke valve 6 in accordance with a change of a rotation speed of the internal combustion engine 1 based on the opening degree of the throttle valve 7, and, when the rotation speed of the internal combustion engine 1 is constant, controls the opening degree of the choke valve 6 based on a map which determines the opening degree of the choke valve 6 from load of the internal combustion engine 1, so as to achieve a desired air-fuel ratio.

5 Claims, 8 Drawing Sheets

(56) References Cited

U.S. PATENT DOCUMENTS

| | | | |
|---|---|---|---|
| 5,345,912 A | | 9/1994 | Svensson et al. |
| 5,988,139 A | * | 11/1999 | Wasilewski et al. ..... 123/339.11 |
| 2006/0266330 A1 | | 11/2006 | Fukushima et al. |
| 2008/0245331 A1 | | 10/2008 | Kumagai et al. |

FOREIGN PATENT DOCUMENTS

| | | |
|---|---|---|
| CN | 101280727 | 10/2008 |
| EP | 0 411 283 A2 | 2/1991 |
| EP | 1 574 700 A2 | 9/2005 |
| EP | 1 754 878 A1 | 2/2007 |
| GB | 1 498 777 | 1/1978 |
| JP | 51-87628 | 7/1976 |
| JP | 51-144833 | 12/1976 |
| JP | 59-128958 | 7/1984 |
| JP | 59-224451 | 12/1984 |
| JP | 63-167061 | 7/1988 |
| JP | 64-8184 | 2/1989 |
| JP | 2004-232529 | 8/2004 |
| JP | 2006-329095 | 12/2006 |
| JP | 2007-23838 | 2/2007 |
| JP | 2008-255881 | 10/2008 |

OTHER PUBLICATIONS

International Search Report issued Sep. 21, 2010 in corresponding International Application No. PCT/JP2010/064337.
Extended European Search Report issued Sep. 2, 2013 in corresponding European Application No. 10824723.0.
Office Action issued Aug. 5, 2013 in corresponding Chinese Application No. 2010800437634, with full English translation.
Office Action issued Mar. 28, 2013 in corresponding Taiwanese Application No. 099130498 (with English translation).
International Preliminary Report on Patentability and Written Opinion of the International Searching Authority issued May 24, 2012 in corresponding International Application No. PCT/JP2010/064337.

* cited by examiner

Requirements

◆ STB (conventional carburetor)

△ In the aim of clean emission
(smaller main jet and slow jet + choke valve control)

● In the aim of saving gas
(smaller main jet and slow jet + choke valve control)

FIG. 7G

AIR-FUEL RATIO CONTROL DEVICE FOR A CARBURETOR

TECHNICAL FIELD

The present invention relates to an air-fuel ratio control device for a carburetor, which achieves a desired air-fuel ratio by controlling a choke valve in order to achieve clean emission and fuel efficiency of a general-purpose internal combustion engine.

BACKGROUND ART

In a general-purpose internal combustion engine used as a drive source to be used for a generator, an agricultural machine or the like, an internal combustion engine using an automatic choke device is proposed to improve a starting performance in cold start operation. Such automatic choke device controls opening and closing of a choke valve in a carburetor by an actuator when starting the internal combustion engine so as to produce a higher concentration of fuel mixed in the air (hereinafter called as air-fuel ratio) and improve the starting performance of the internal combustion engine.

Such technique is proposed in Japanese Laid-Open Patent Application No. 2007-23838 (Patent Literature 1).

CITATION LIST

Patent Literature

[PTL 1]
Japanese Laid-Open Patent Application No. 2007-23838 A

SUMMARY OF INVENTION

Technical Problem

The automatic choke device merely reduces the air-fuel ratio (higher concentration of fuel) during engine startup and, once the internal combustion engine is in operation, opens the choke valve to full-open state where rotation adjustment of the internal combustion engine is not performed.

On the other hand, it is desired to meet change of requirement specifications, e.g. fuel efficiency of the engine and clean emission. In the case of an internal combustion engine for a passenger vehicle, an electronically controlled fuel injection equipment is proposed. Such equipment of the same specification can be produced in large quantities at low-cost and with steady and high quality. However, high-mix low-volume production of such equipment to be used as a wide variety of drive sources in a general-purpose internal combustion engine, is high-cost.

A general carburetor has a fixed-venturi and thus, the general carburetor cannot achieve a desired air-fuel ratio in both of a low-speed operation and a high-speed operation. Thus, the general-purpose internal combustion engine is set to operate efficiently within a certain range of rotation speed and load (output) of a optimal operating state for a variety of uses such as a generator and an agricultural machine. However, a desired air-fuel ratio cannot be achieved in the entire operational range of the internal combustion engine.

As a result, the general carburetor cannot adapt to anticipated emission restriction and fuel efficiency requirement.

In view of the above issues, it is an object of the present invention to provide an air-fuel ratio control device for a carburetor, which is capable of variably inject fuel by opening and closing a choke valve in accordance with an opening degree of a throttle valve and the load and which is capable of achieving low cost, clean emission and fuel saving by attaining a desired air-fuel ratio in an entire operational range (rotation speed, load) of the internal combustion engine.

Solution to Problem

To achieve the object of the present invention, the present invention provides an air-fuel ratio control device for a carburetor, which may include, but is not limited to:

a choke valve arranged in an intake path of an internal combustion engine;

a throttle valve arranged in the intake path on a downstream side of the choke valve;

a first stepper motor driving the choke valve to adjust an opening degree of the choke valve;

a second stepper motor driving the throttle valve to adjust an opening degree of the throttle valve; and a controller which controls the opening degree of the choke valve in accordance with a change of a rotation speed of the internal combustion engine based on the opening degree of the throttle valve, and, when the rotation speed of the internal combustion engine is constant, controls the opening degree of the choke valve based on a map which determines the opening degree of the choke valve from load of the internal combustion engine, so as to achieve a desired air-fuel ratio.

With this structure, it is possible to maintain an ideal air-fuel ratio in the carburetor in a wide range (rotation speed and load) of the internal combustion by driving the choke valve in accordance with the opening degree of the throttle valve with respect to the rotation speed and the load of the internal combustion engine. As a result, it is possible to improve clean emission of the exhaust gas and energy saving.

Further, in the case of using the internal combustion engine equipped with the automatic choke device to improve starting performance in the cold start operation, only few parts are needed and it is inexpensive to implement it.

In the above device, the map may include a first map based on which the opening degree of the choke valve is adjusted to put a high priority on emission reduction when the rotation of the internal combustion engine is constant and a second map based on which the opening degree of the choke valve is adjusted to put a high priority on fuel efficiency when the rotation of the internal combustion engine is constant, and one of the first map and the second map may be selected according to an intended use of the internal combustion engine.

With this structure, it is possible to adjust the air-fuel ratio depending on situations on a load side of the internal combustion engine. As a result, the air-fuel ratio can be finely controlled for an intended purpose in the wide range of the internal combustion engine. This has good effects in view of the environment and fuel efficiency.

In the above device, the map may include an output map based on which an output is estimated from the opening degree of the throttle valve and the rotation speed and a choke valve opening map based on which the opening degree of the choke valve is determined from the estimated output and the rotation speed, and the opening and closing of the choke valve may be controlled based on the rotation speed of the internal combustion engine so as to control the air-fuel ratio.

With this structure, it is possible to estimate the output of the internal combustion engine from the rotation speed and the opening degree of the throttle valve. Thus, it is not necessary to provide a separate sensor for detecting the air-fuel ratio, thereby reducing the device cost.

The above device may further include an O2 sensor which measures oxygen concentration in exhaust gas of the internal combustion engine, and the map may include an output map based on which an output is estimated and an air-fuel ratio map based on which the air-fuel ratio is determined from the estimated output and the rotation speed, and the control unit may perform feedback control to adjust the air-fuel ratio to a desired air-fuel ratio determined based on the air-fuel ratio-map from the measured oxygen concentration in the exhaust gas.

With this structure, the oxygen concentration in the exhaust gas is directly measured and the feedback control is performed to adjust the air-fuel ratio to the desired air-fuel ratio of the map. As a result, it is possible to absorb errors such as error of the opening degree of the choke valve in the carburetor, and thus, it is possible to control the air-fuel ratio with precision in the entire operational range of the internal combustion engine to improve clean emission and energy efficiency.

The above device may further include a main jet and a slow jet which are provided between the choke valve arranged in the intake path of the internal combustion engine and the throttle valve, the main jet and the slow jet ejecting fuel into the intake path, and an amount of fuel injected from the main jet may be set at minimum for the internal combustion engine to rotate smoothly with respect to the opening degree of the throttle valve.

With this structure, the air-fuel ratio is adjusted by the choke valve in accordance with the load fluctuation in response to a target (desired) rotation speed. Thus, it is possible to response quickly and not more than a required amount of fuel is injected through the main jet. As a result, the desired air-fuel ratio can be obtained and the clean emission of the exhaust gas and the fuel efficiency can be improved.

Advantageous Effects of Invention

According to the present invention, by driving the choke valve in accordance with the opening degree of the throttle valve with respect to the rotation speed and the load of the internal combustion engine, it is possible to maintain the ideal air-fuel ratio in the carburetor in the wide range (rotation speed and load) of the internal combustion engine. As a result, the clean emission of the exhaust gas (reduction of carbon monoxide) and the fuel efficiency can be improved.

provide an air-fuel ratio control device for a carburetor, which is capable of variably inject fuel by opening and closing a choke valve in accordance with an opening degree of a throttle valve and the load and which is capable of achieving low cost, clean emission and fuel saving by attaining a desired air-fuel ratio in an entire operational range (rotation speed, load) of the internal combustion engine.

Further, in the case of using the internal combustion engine equipped with the automatic choke device to improve starting performance in the cold start operation, only few parts are needed and it is inexpensive to implement it.

BRIEF DESCRIPTION OF DRAWINGS

FIG. 5C to FIG. 5E show results in 6-mode comparative tests of the internal combustion engine in relation to the first preferred embodiment of the present invention.

FIG. 7F is an output map and FIG. 7G is an air-fuel ratio map. The maps are used to obtain oxygen concentration in the exhaust gas in relation to the second preferred embodiment of the present invention.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

A first preferred embodiment is explained in reference to FIG. 1 to FIG. 5.

Figure 1:
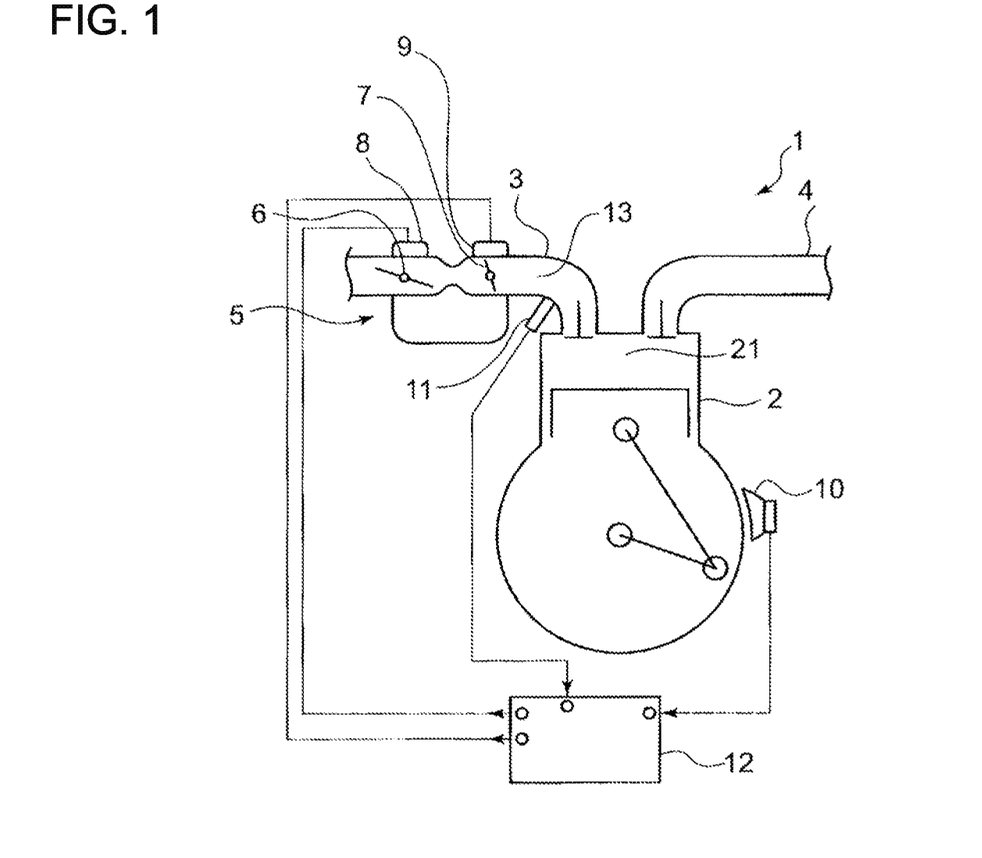
FIG. 1 is a schematic view of an overall structure of an internal combustion engine in relation to a first preferred embodiment of the present invention.

FIG. 1 is a schematic view of an overall structure of an internal combustion engine in relation to the first preferred embodiment of the present invention. FIG. 1 shows the internal combustion engine 1 having an main body 2 of the engine. An intake pipe 3 is arranged on an upper part of the main body 2 of the engine to introduce mixed air to a combustion chamber 21 in the main body 2 of the engine. The mixed air is a mixture of fuel and air. Further, an exhaust pipe 4 is arranged on the upper part of the main body 2 of the engine to exhaust combustion gas (exhaust gas) combusted in the combustion chamber 21 in the main body 2 of the engine to outside of the main body 2 of the engine. A carburetor 5 with a fixed-venturi 53 is installed in the intake pipe 3. The carburetor 5 mixes air and fuel. A temperature sensor 11 measures a temperature of the main body 2 of the engine and detects a state of warm air of the main body 2 of the engine. A controller 12 controls an opening degree of a choke valve 6 and an opening degree of a throttle valve 7 and then, performs a choke control when starting the internal combustion engine 1 and also controls the air-fuel ratio when the internal combustion engine 1 is in operation.

Figure 2:
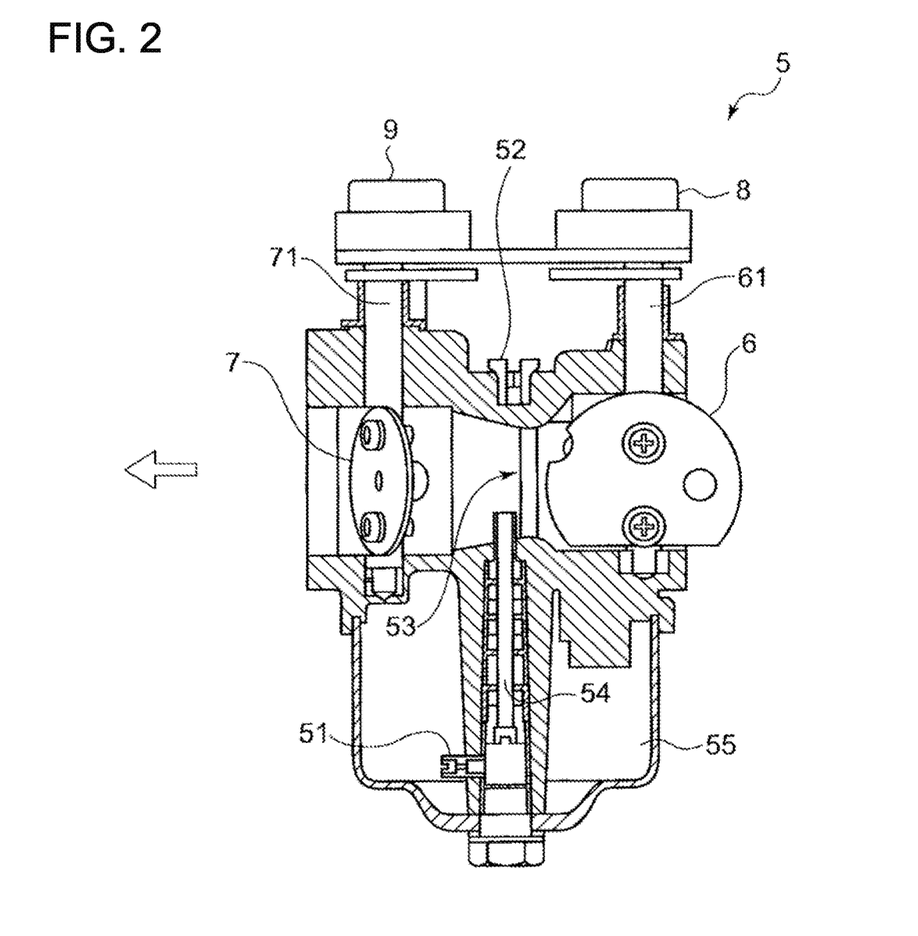
FIG. 2 is a schematic cross-sectional view of a carburetor in a longitudinal direction in relation to the first preferred embodiment of the present invention.

As shown in FIG. 2, the carburetor 5 has the choke valve 6 on an upstream side in the intake path 13 and the throttle valve 7 on a downstream of the choke valve 6 across a venturi portion 53 from the choke valve 6. The choke valve 6 is fixed to a choke-valve drive shaft 61 and the choke-valve drive shaft 61 is connected to a first stepper motor 8. The first stepper motor 8 drives the choke-valve drive shaft 61 to adjust the opening degree of the choke valve 6 based on a signal from the controller 12.

The throttle valve 7 is fixed to a throttle-valve drive shaft 71 and the throttle-valve drive shaft 71 is connected to a second stepper motor 9. The second stepper motor 9 drives the throttle-valve drive shaft 71 to adjust the opening degree of the throttle valve 7 based on a signal from the controller 12.

A slow jet 52 and a main jet 51 are provided in the carburetor 5. The amount of fuel sprayed to the venture portion 53 between the choke valve 6 and the throttle valve 7 is adjusted through the slow jet 52 via a sub-nozzle (not shown) and through the main jet 51 via a main nozzle 54.

When the internal combustion engine 1 is idling or operating at low rotation speed, supply of fuel is adjusted through the slow jet 52 so that not more than a set amount of fuel is sprayed. When the internal combustion engine 1 is operating at mid-to-high rotation speed, fuel is mainly sprayed through the main jet 51.

The main jet 51 and the slow jet 52 are in communication with a float chamber 55 of the carburetor 5. In the float chamber 55, the fuel being sent from a fuel tank (not shown) is kept at the same level and supplied to the main jet 51 and the slow jet 52. And amount of fuel is adjusted and sprayed through the main jet 51 and the slow jet 52 to the venturi portion 53.

In response to load fluctuation of the internal combustion engine 1, the opening degree of the choke valve 6 is controlled. Thus, the supply of fuel can be increased but not decreased by means of the choke valve 6. Therefore, the main jet 51 and the slow jet 52 are made smaller compared to conventional nozzles for ejecting fuel so as to suppress the ejection amount of the fuel. This prevents high concentration of fuel so as to promote the fuel efficiency and the clean emission of the exhaust gas.

The rotation speed is inputted from a rotation speed sensor 10 to the controller 12 and the temperature of the main body 2 of the engine is inputted from the temperature sensor 11 to the controller 12. When the temperature of the main body 2 of the engine is lower than an arbitrary temperature, the choke valve 6 is closed to restrict the flow of the air so as to achieve smooth rotation of the internal combustion engine and also to enhance warming up the engine.

Once the main body 2 of the engine is warmed and ready to output, the air-fuel ratio control begins.

Figure 3A:
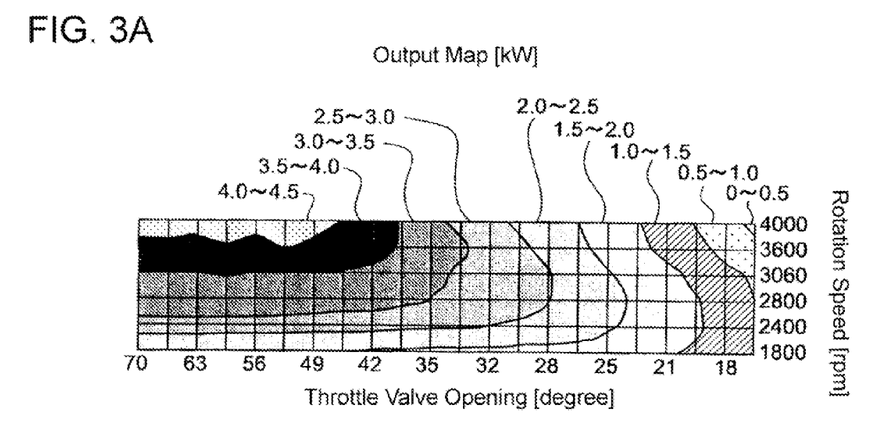
FIG. 3A is an output map and FIG. 3B is a choke valve opening degree map. The maps are used to obtain an opening degree of a choke valve in relation to the first preferred embodiment of the present invention.

FIG. 3A is an output map obtained from test values of load (output) distribution of the internal combustion engine 1 based on the rotation speed of the internal combustion engine 1 and the opening degree of the throttle valve 7.

Figure 3B:
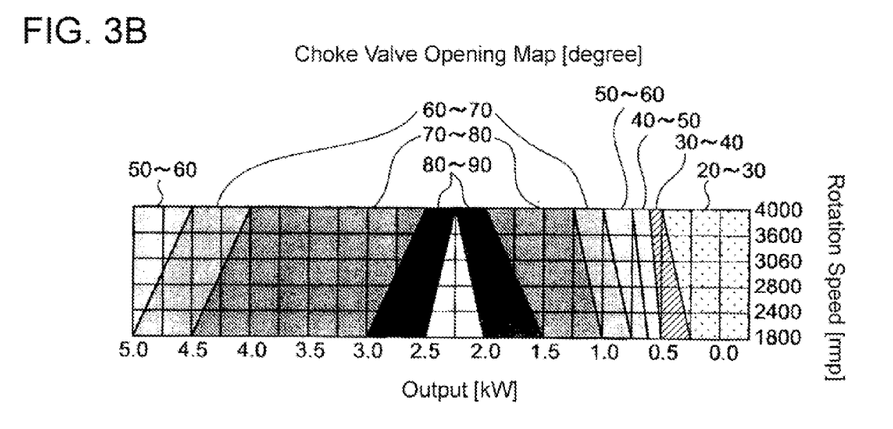

Further, FIG. 3B is a choke valve opening degree map obtained from test values of the opening degree of the choke valve 6 based on the rotation speed and the output of the internal combustion engine 1.

Figure 4:
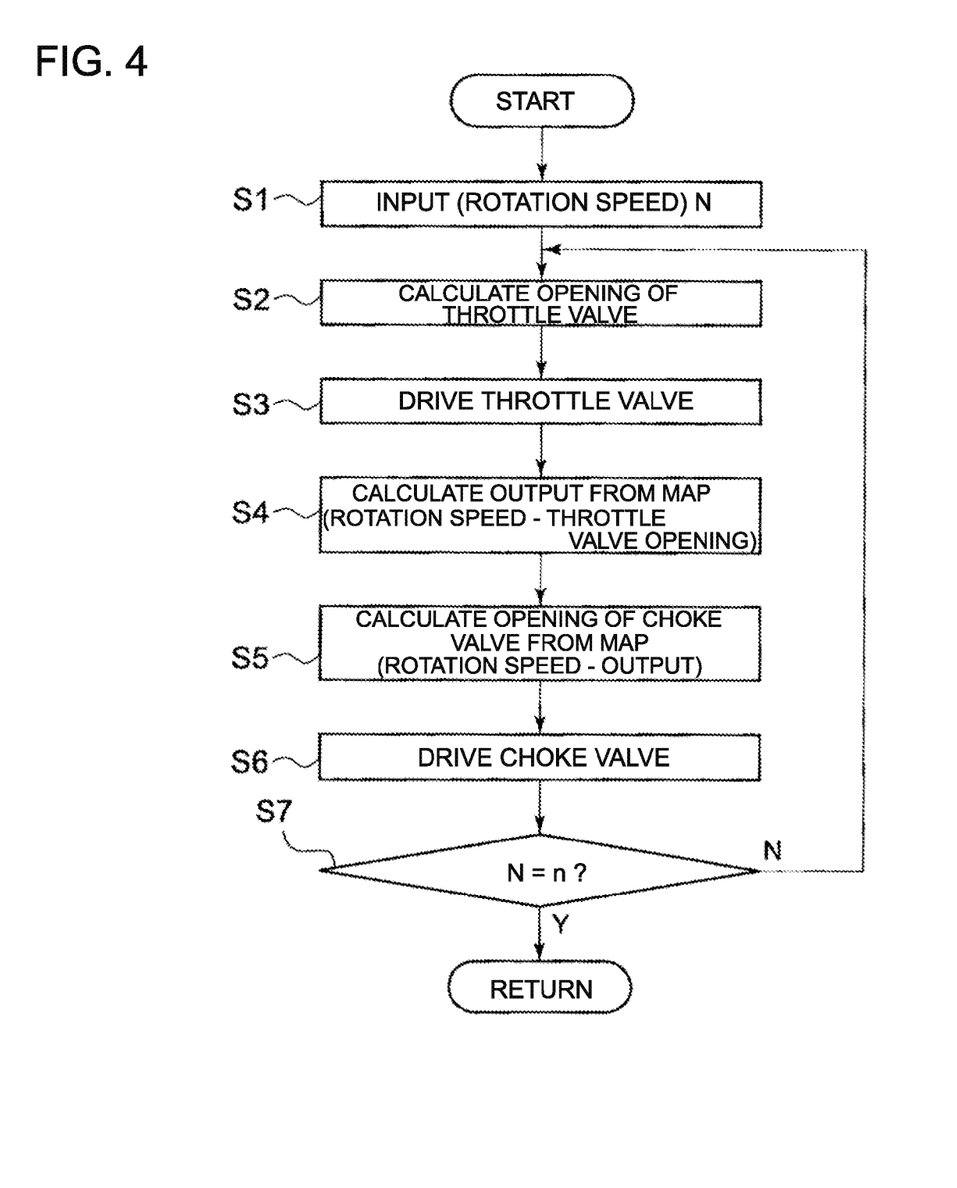
FIG. 4 is a flow chart of adjusting the opening degree of the choke valve in relation to the first preferred embodiment of the present invention.

As shown in a control flow of FIG. 4, in a step S1, a desired rotation speed N is inputted to the controller 12 based on a desired load from an operation machine side such as generators and agricultural machines. In a step S2, the opening degree of the throttle valve 7 corresponding to the rotation speed N is calculated from performance property of the internal combustion engine 1. In a step 3, a drive signal for the throttle valve 7 is transmitted from the controller 12 to the second stepper motor 9, and the second stepper motor 9 drives the throttle valve 7 to open the throttle valve 7 to such a position to achieve the desired rotation speed of the internal combustion engine 1.

In a step S4, the output of the internal combustion engine 1 is estimated based on the map of FIG. 3A from the opening degree of the throttle valve 7 and the rotation speed of the internal combustion engine. In a step S5, the opening degree of the choke valve 6 is determined from the output estimated from the map of FIG. 3B and the rotation speed N having been inputted to the controller 12.

In a step S6, a drive signal for the choke valve 6 is sent from the controller 12 to the first stepper motor 8 so that the first stepper motor 8 drives the choke valve 6 to open the choke valve 6 to a set position. In a step S7, a detected rotation speed detected by the rotation speed sensor 10 and the desired rotation speed N are compared. When the detected rotation speed and desired rotation speed N are not the same, it is determined as N (NO) and the process returns to the step S2 to correct the opening degree of the throttle valve 7 and modify the air-fuel ratio, thereby adjusting the load of the internal combustion engine 1. When the detected rotation speed and desired rotation speed are the same, it is determined as Y (YES) and the process returns to the start.

Figure 5C:
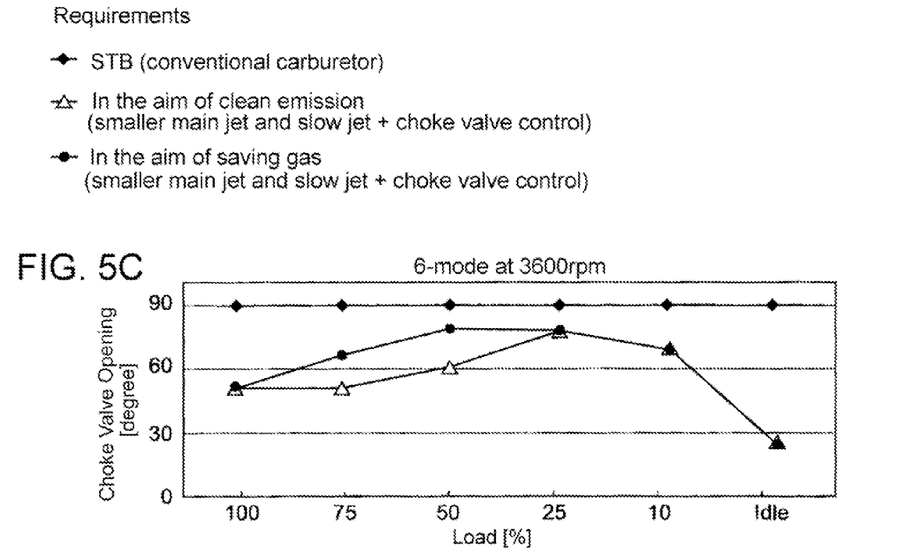
FIG. 5C shows an opening degree of the choke valve with respect to load.
Figure 5D:
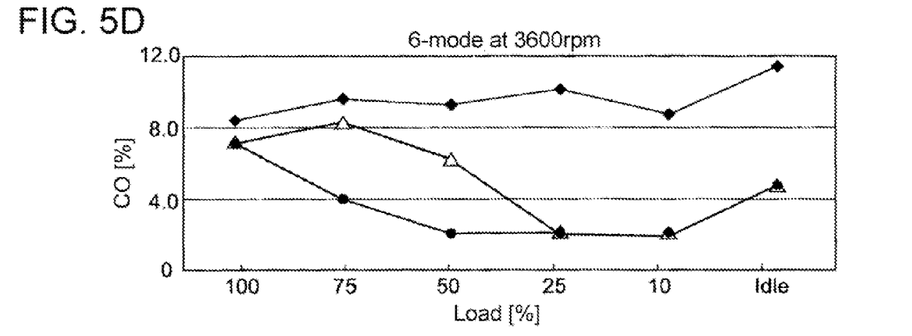
FIG. 5D shows CO concentration in exhaust gas with respect to load.
Figure 5E:
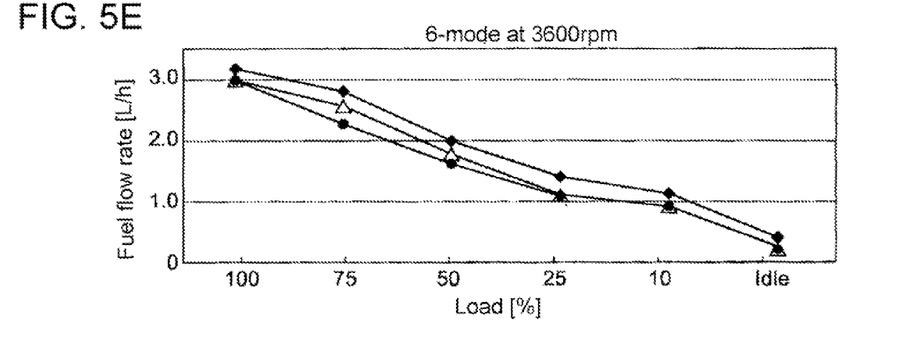
FIG. 5E shows fuel consumption with respect to load.

FIG. 5C to FIG. 5E show results in 6-mode comparative test of the internal combustion engine at 3600 RPM. The test result of a conventional carburetor (STD) is indicated by a line —♦—. The test result in the aim of achieving clean emission (clean emission of exhaust gas CO as a main target) is indicated by a line —Δ—. In that case, the main jet 51 and the slow jet 52 are both smaller and the choke valve is controlled.

The test result in the aim of saving energy (saving gas as a main target) is indicated by a line —•—. In that case, the main jet 51 and the slow jet 52 are both smaller and the choke valve is controlled.

FIG. 5C shows the load (%) in the 6-mode comparative test on a horizontal axis and the opening degree of the choke valve on a vertical axis. The conventional carburetor indicated by —♦— does not perform choke valve control and thus, the opening degree of the choke valve is 90° in the entire load range. —Δ— and —•— indicate that the choke control is perfromed. FIG. 5D shows the load (%) on the horizontal axis and CO concentration (%) (measured in the exhaust pipe of the internal combustion engine) on the vertical axis. FIG. 5E shows the load (%) on the horizontal axis and a flow rate of the fuel (L/h) on the vertical axis.

It is obvious from the flow rate of FIG. 5E that in a common output range of 50% load and 75% load, the opening degree of the choke valve 6 is increased compared to the clean emission case in order to improve fuel efficiency (to save gas), thereby reducing the amount of fuel sprayed by means of the check valve 6.

In the aim of clean emission in 50% load and 75% load (CO reduction), the amount of fuel to be sprayed is slightly increased. The CO concentration in the exhaust gas and the flow rate of the fuel are both higher than those of the fuel efficiency case.

By increasing the amount of fuel, it is possible to keep the gas temperature in the pipe low and to enhance clean emission of the exhaust gas (NOx) exhausted to the air from the internal combustion engine.

It is obvious from the above test results that CO concentration in the exhaust gas can be reduced and the fuel efficiency can be improved. There are two cases with the smaller jet and the choke valve control, one being the clean emission case where the main object is to achieve clean emission (CO reduction) and the other being the fuel efficiency case where the main object is to save the fuel. Two types of map are prepared for the clean emission case and the fuel efficiency case to determine the opening degree of the choke valve 6 for the intended purpose.

Thus, it is possible to choose the map that is appropriate for the intended purpose before shipping the internal combustion engine 1.

In the preferred embodiment, the opening degree of the choke valve 6 is adjusted while the opening degree of the throttle valve 7 is kept the same with respect to the rotation speed and the load of the internal combustion engine 1 in operation. By this, it is possible to achieve an ideal air-fuel ratio in the carburetor in a wider range of the rotation speed and the load and thus to improve the clean emission and the energy efficiency.

The opening degree of the throttle valve 7 is kept the same and the rotation speed of the internal combustion engine 1 and the choke valve 6 are controlled. Thus, the control process is simplified and more reliable.

Even in the case of using the internal combustion engine equipped with the automatic choke device to improve starting performance in the cold start operation, only few parts are needed and it is inexpensive to implement it.

Second Preferred Embodiment

Figure 6:
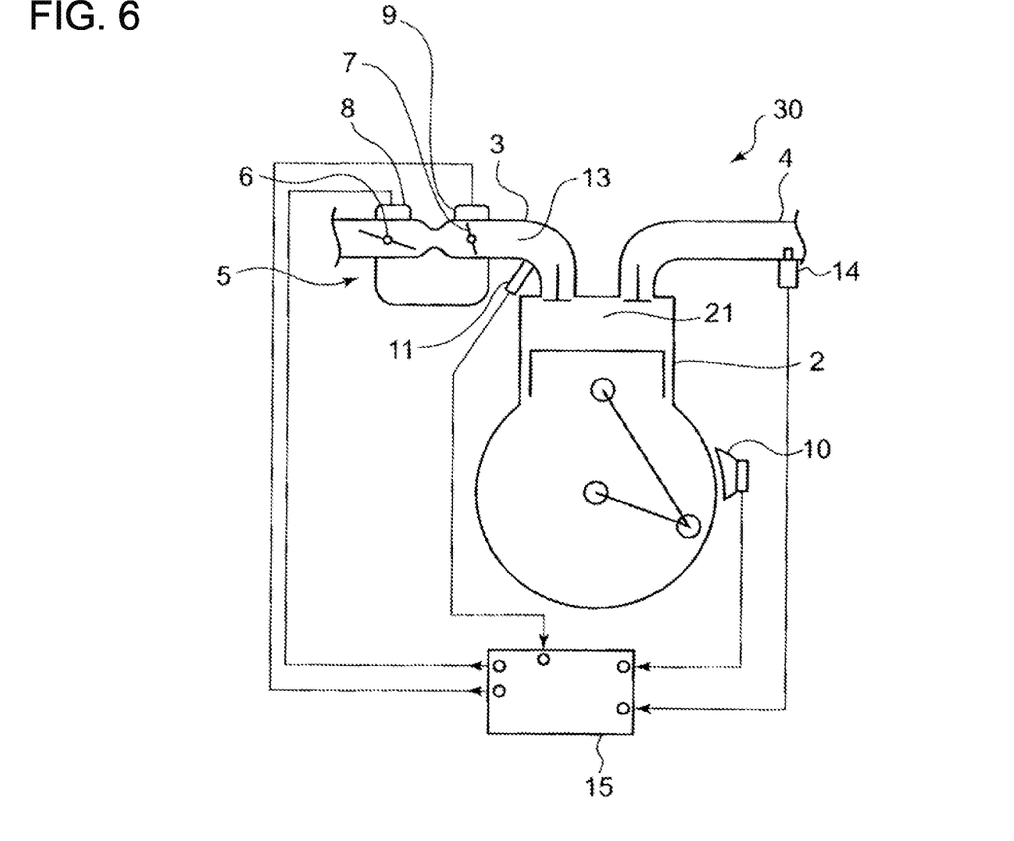
FIG. 6 is a schematic view of an overall structure of an internal combustion engine in relation to a second preferred embodiment of the present invention.
Figure 7F:
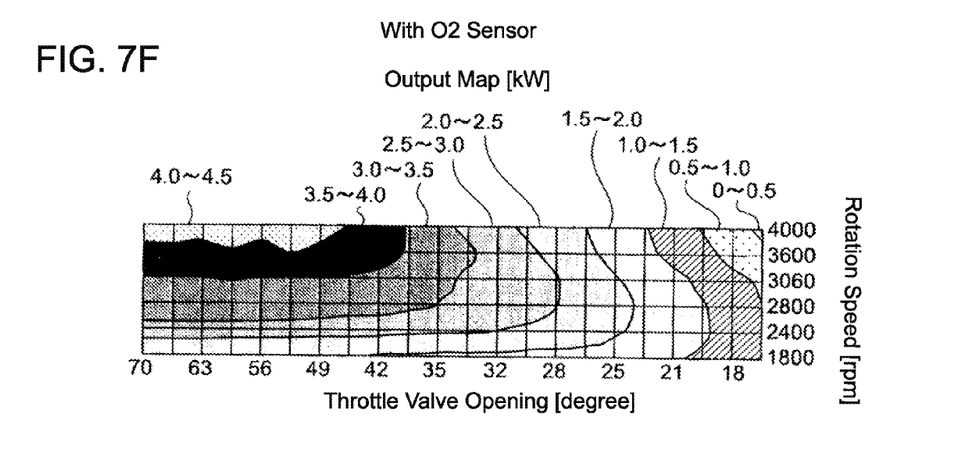
Figure 7G:
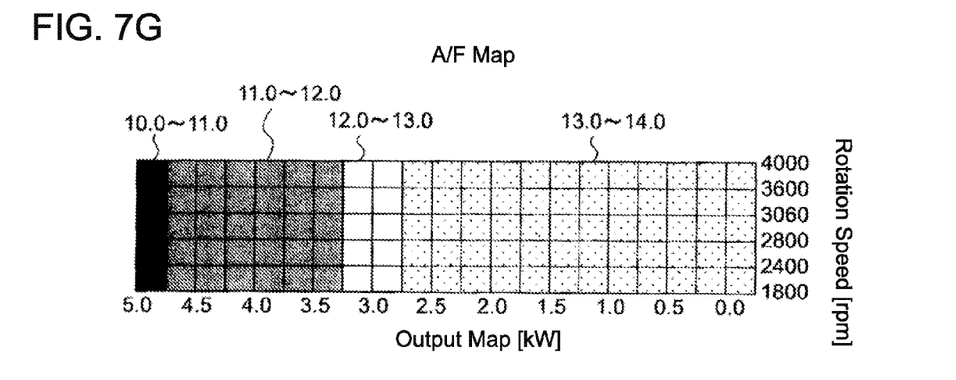
Figure 8:
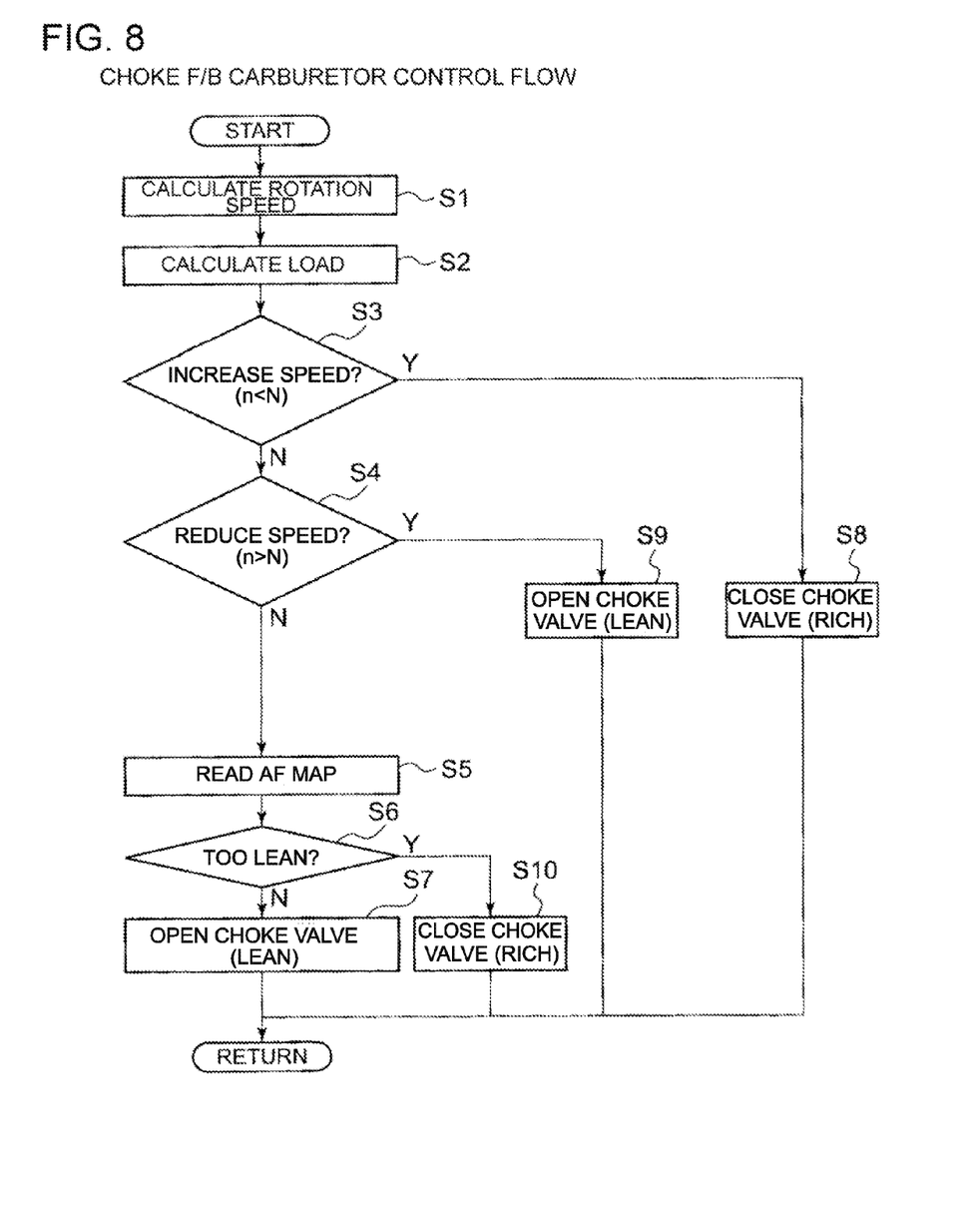
FIG. 8 is a flow chart of feedback control of the air-fuel ratio in relation to the second preferred embodiment of the present invention.

A second preferred embodiment in relation to the preferred embodiment is explained in reference to FIG. 6 to FIG. 8.

FIG. 6 is a schematic view of an overall structure of an internal combustion engine in relation to the second preferred embodiment of the present invention.

The same components as the first preferred embodiment are indicated by the same reference numerals. FIG. 6 shows the internal combustion engine 30 having an main body 2 of the engine. An intake pipe 3 is arranged on an upper part of the main body 2 of the engine to introduce mixed air to a combustion chamber 21 in the main body 2 of the engine. The mixed air is a mixture of fuel and intake air. Further, an exhaust pipe 4 is arranged on the upper part of the main body 2 of the engine to introduce the mixed air combusted in the combustion chamber 21 in the main body 2 of the engine to outside of the main body 2 of the engine. A temperature sensor 11 measures a temperature of the main body 2 of the engine and detects a warm-up state of the main body 2. An $O_2$ sensor measures oxygen concentration in the exhaust gas combusted in the combustion chamber 21. A controller 15 controls the opening degree of the choke valve 6 and the opening degree of the throttle valve 7. In response to measured results from the temperature sensor and $O_2$ sensor 14, the rotation speed of the main body 2 and so on, the controller 15 also performs choke-control when starting the internal combustion engine 30 and feedback control of the air-fuel ratio with high precision based on oxygen concentration in the exhaust gas when the internal combustion engine 30 is in operation.

Different from the first preferred embodiment, the $O_2$ sensor 4 is provided and accordingly the control process by the controller changes. The rest of the structure that is the same as the first preferred embodiment is not explained further here.

To the controller 15, the rotation speed is inputted from the rotation speed sensor 10 and the temperature of the main body 2 is inputted from the temperature sensor 11. When the temperature of the main body 2 of the engine is below an arbitrary temperature, the choke valve 6 is closed to warm up the engine and to achieve smooth engine rotation of the internal combustion engine 30.

In a step S2, the opening degree of the throttle valve 7 corresponding to the rotation speed N is calculated from performance property of the internal combustion engine 1. In a step 3, a drive signal for the throttle valve 7 is transmitted from the controller 12 to the second stepper motor 9, and the second stepper motor 9 drives the throttle valve 7 to open the throttle valve 7 to such a position to achieve the desired rotation speed of the internal combustion engine 1.

Once the main body 2 of the engine is warmed and ready to output, the air-fuel ratio control begins.

FIG. 7F is an output map obtained from test values of load (output) distribution of the internal combustion engine 1 based on the rotation speed of the internal combustion engine 1 and the opening degree of the throttle valve 7. FIG. 7F corresponds to FIG. 3A.

Further, a desired air-fuel ratio distribution is made from test values based on the load and the rotation speed, which is shown in FIG. 7G.

The air-fuel ratio is adjusted to the desired air-fuel ratio by controlling the choke valve in reference to FIG. 7G.

The process up to finishing of the warm-up operation of the internal combustion engine 30 is the same as that of the first preferred embodiment and thus, not explained further. The process after completing the warm-up operation is shown in a control flow chart of FIG. 8. In a step S1, the rotation speed is calculated from the signal from the rotation speed sensor 10. In a step S2, the load is calculated from the map of FIG. 7F based on the rotation speed and the opening degree of the throttle valve 7. In a step S3, a current rotation speed of the internal combustion engine 30 and the desired rotation speed N are compared. When it is determined to increase the rotation speed n (YES), the process advances to a step S8. In the step S8, the choke value 6 is driven toward a close-position to increase the fuel concentration, thereby improving the rotation speed.

When it is determined not to increase the rotation speed n (NO), the process advances to a step S4.

Alternatively, a current opening degree and a desired opening degree of the throttle valve (the internal combustion engine 30) may be compared.

In the step S4, the rotation speed n and the desired rotation speed N are compared. When it is determined to reduce the rotation speed n (YES), the process advances to a step S9 to drive the choke valve 6 toward an open position, thereby reducing the rotation speed. When the rotation speed n and the desired rotation speed N are the same in the step S4, the process advances to a step S5 to read the air-fuel ratio map. In the step S5, a desired air-fuel ratio is obtained from the map of FIG. 7G based on the load and the rotation speed which are calculated in the step S2. In a step S6, when the oxygen concentration from the O2 sensor is high, i.e. high air-fuel ratio and low fuel concentration (YES), the process advances to a step S10. In the step S10, the choke valve is driven toward the close position to increase the fuel concentration, thereby stabilizing the rotation of the internal combustion engine 30. When it is determined in the step S6 that the air-fuel ratio is small, i.e. high concentration of fuel (NO), the choke valve is driven toward the open position to reduce the fuel concentration.

In the second preferred embodiment, the opening degree of the choke valve 6 is adjusted in reference to changes in rotation speed in response to the load fluctuation, while the opening degree of the throttle valve 7 is kept the same. In this manner, it is possible to determine from the amount of oxygen (%) in the exhaust gas whether or not the desired air-fuel ratio is achieved. Therefore, it is possible to control the clean emission and the energy efficiency more precisely and to effectively achieve energy efficiency and the clean emission.

INDUSTRIAL APPLICABILITY

The device can be applied to a general-purpose internal combustion engine of a carburetor type used as an agricultural machine or a drive source for a generator in the aim of improving the fuel efficiency and achieving the clean emission.

The invention claimed is:

1. An air-fuel ratio control device for a carburetor, comprising:
    a choke valve arranged in an intake path of an internal combustion engine;
    a throttle valve arranged in the intake path on a downstream side of the choke valve;
    a first stepper motor driving the choke valve to adjust an opening degree of the choke valve;
    a second stepper motor driving the throttle valve to adjust an opening degree of the throttle valve; and
    a controller which controls the opening degree of the choke valve in accordance with a change of a rotation speed of the internal combustion engine based on the opening degree of the throttle valve, and, when the rotation speed of the internal combustion engine is constant, controls the opening degree of the choke valve based on a map which determines the opening degree of the choke valve from load of the internal combustion engine, so as to achieve a desired air-fuel ratio.

2. The air-fuel ratio control device for the carburetor, according to claim 1,
    wherein the map comprises:
    a first map based on which the opening degree of the choke valve is adjusted to put a high priority on emission reduction when the rotation of the internal combustion engine is constant; and
    a second map based on which the opening degree of the choke valve is adjusted to put a high priority on fuel efficiency when the rotation of the internal combustion engine is constant,
    wherein one of the first map and the second map is selected according to an intended use of the internal combustion engine.

3. The air-fuel ratio control device for the carburetor, according to claim 1,
    wherein the map comprises:
    an output map based on which an output is estimated from the opening degree of the throttle valve and the rotation speed; and
    a choke valve opening map based on which the opening degree of the choke valve is determined from the estimated output and the rotation speed, and
    wherein opening and closing of the choke valve is controlled based on the rotation speed of the internal combustion engine so as to control the air-fuel ratio.

4. The air-fuel ratio control device for the carburetor, according to claim 1, further comprising:
    an $O_2$ sensor which measures oxygen concentration in exhaust gas of the internal combustion engine,
    wherein the map comprises:
    an output map based on which an output is estimated; and
    an air-fuel ratio map based on which the air-fuel ratio is determined from the estimated output and the rotation speed, and
    wherein the control unit performs feedback control to adjust the air-fuel ratio to a desired air-fuel ratio determined based on the air-fuel ratio-map from the measured oxygen concentration in the exhaust gas.

5. The air-fuel ratio control device for the carburetor, according to claim 1, further comprising:
    a main jet and a slow jet which are provided between the choke valve arranged in the intake path of the internal combustion engine and the throttle valve, the main jet and the slow jet ejecting fuel into the intake path,
    wherein an amount of fuel injected from the main jet is set at minimum for the internal combustion engine to rotate smoothly with respect to the opening degree of the throttle valve.

* * * * *